Jan. 26, 1932.  T. H. THOMAS ET AL  1,842,483
SAFETY CAR EQUIPMENT
Filed Nov. 11, 1929  2 Sheets-Sheet 2

INVENTORS
THOMAS H. THOMAS DECEASED
MABLE M. THOMAS, EXECUTRIX.
AND
UNCAS A. WHITAKER
BY *Wm. M. Cady*
ATTORNEY Patented Jan. 26, 1932

1,842,483

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, AND UNCAS A. WHITAKER, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA

SAFETY CAR EQUIPMENT

Application filed November 11, 1929. Serial No. 406,302.

This invention relates to fluid pressure brake and door controlling apparatus for vehicles and more particularly to a safety car control equipment.

The principal object of the invention is to provide an improved fluid pressure brake and door controlling apparatus which is adapted to be normally controlled by one of the operator's feet, thus obviating the use of the hand operated brake valve device and hand operated door controlling valve device commonly employed and leaving the operator's both hands free for making change, collecting fares, or for any other purpose.

Another object of the invention is to provide a combined brake valve and door controlling valve device for a vehicle, which device comprises means operative upwardly and downwardly under the control of one foot of an operator for controlling the application and release of the brakes, and also comprises means operative sidewise under the control of the same foot for controlling the operation of the door or doors of the vehicle.

Another object of the invention is to provide a foot controlled valve device for a safety car control equipment, embodying novel means for controlling the graduated application and release of the brakes.

A further object of the invention is to provide an improved safety car control equipment having novel means for effecting an emergency application of the brakes in case the operator is incapacitated.

A still further object of the invention is to provide a fluid pressure brake and door controlling apparatus for a vehicle, having novel means for effecting an application of the brakes in the event of the vehicle door being opened and to prevent the release of the brakes until the door is closed.

Other objects and advantages will appear in the following more detailed description of the invention.

In the accompanying drawings.

Figure 1:
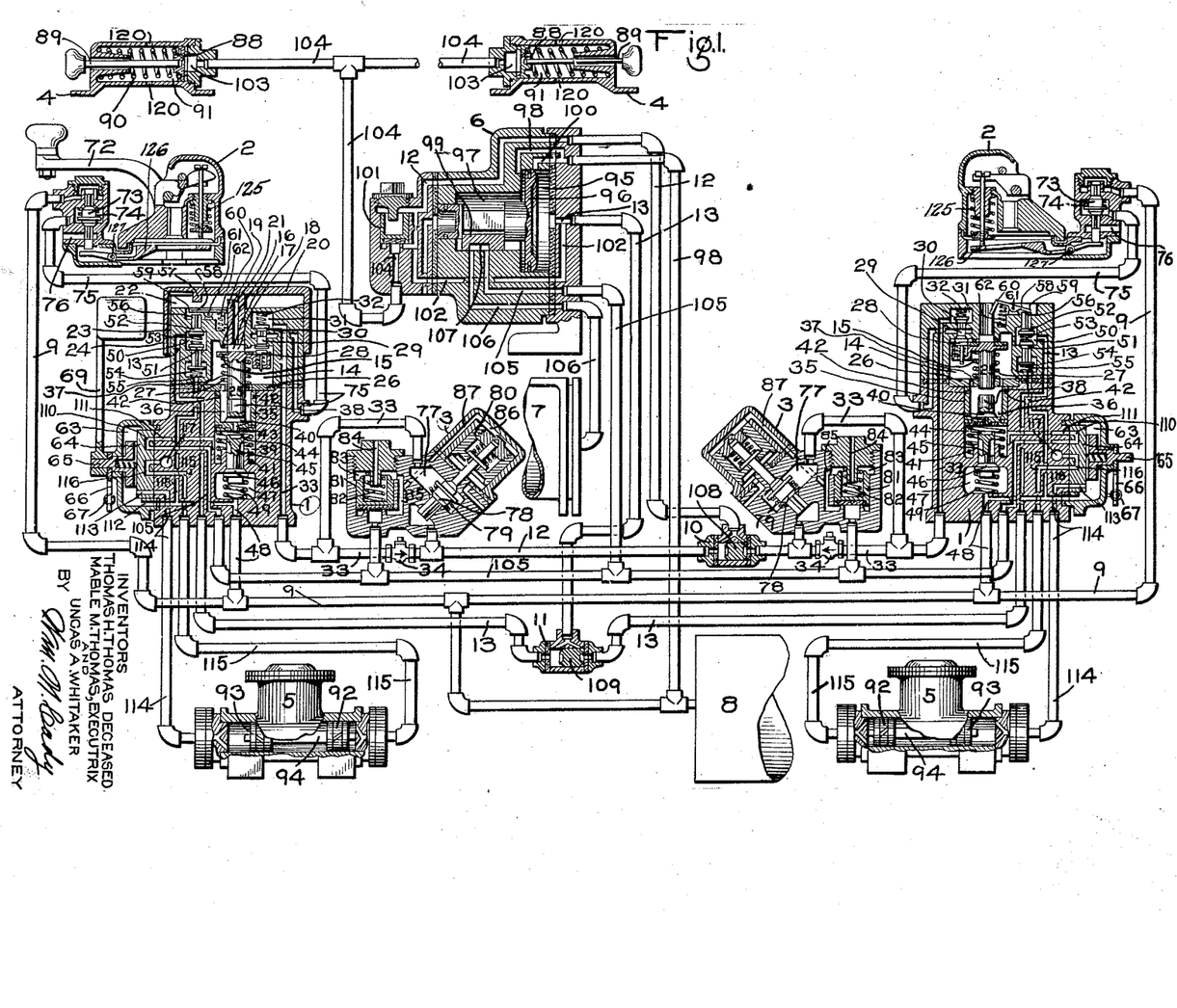
Figure 1 is a diagrammatic view, mainly in section, of a safety car control equipment embodying the invention.

As shown in the accompanying drawings, the safety car control equipment is of the double end type, and at each end of the car may comprise a combined foot controlled brake and door controlling valve device 1, a safety controller handle device 2, a cut-off valve device 3, a circuit breaker device 4 and a door engine 5. The equipment may also comprise an emergency valve device 6, a brake cylinder 7, a main reservoir 8, a main reservoir pipe 9 and double check valves 10 and 11 interposed in the safety control and emergency pipes 12 and 13 respectively.

Each of the combined brake and door controlling valve devices 1 may comprise a casing having a chamber 14 containing a release valve 15 which is adapted to seal against a seat ring 16 on the casing. This valve is provided with a short, upwardly extending stem 17 which is slidably guided in the casing, and which is provided with a groove or passage 18. The upper end of this stem is adapted to be engaged by the lower end of a projection 19 which may be integral with a foot pad or cap 20 fitting loosely over the upper end of the casing, and which is operative upwardly and downwardly relative to the casing to control the brakes.

The projection 19 has a central bore 21 which, at one end, communicates with the groove 17 and, at the other end, communicates with a chamber 22 defined by the inner surface of the foot cap 20 and the top surface of the casing, which chamber is connected to the atmosphere preferably through a groove 23 formed in an annular wall 24 of the cap. As shown in the drawings, the wall 24 has a sliding fit with the casing, but it will be understood that if desired, clearance may be provided between the inner surface of the wall and the outer surface of the casing, in which case, the groove 23 may be omitted since the chamber 22 would be connected to the atmosphere through the space between the wall 24 and the casing. In such a case, the projection 19 fitting in the casing would guide the foot cap.

The release valve 15 is further provided with a downwardly depending stem 25 which passes through, and is slidably guided in, a wall 26 of the casing. Surrounding the stem 15, and interposed between and engaging the wall 26 and the under side of the valve 15, is a spring 27, the pressure of which tends, at all times, to operate the valve 15 toward its seated position.

Also contained in the valve chamber 14 and carried by the valve 15, is a spring pressed plunger 28 which is adapted to be moved, with the valve 15, into and out of operative engagement with the lower end of a plunger 29 slidably mounted in the casing, the fit between the plunger and casing being such that fluid under pressure will not be permitted to leak past the plunger. The upper end of this plunger 29 is adapted to operatively engage the lower end of the fluted stem of a safety control pipe vent valve 30 contained in a valve chamber 31, said valve being subject to the pressure of a light spring 32 also contained in the valve chamber 31.

The vent valve chamber 31 is connected to the safety control pipe 12 by way of a passage and pipe 33 and a check valve device 34 which is adapted to prevent the flow of fluid therethrough in a direction opposite to that indicated by the arrow.

Also contained in the casing is a valve piston 35, the chamber 36, at one side of which is connected to the release valve chamber 14 through passages 37 in the casing wall 26. Contained in the chamber 36 and extending upwardly from the central portion of the valve piston, is a projection 38, the upper end of which is adapted to be operatively engaged by the lower end of the release valve stem 25.

With the valve piston 31, at the operating end of the car, in release position as shown in Fig. 1 of the drawings, the chamber 36 is connected to a chamber 39 at the other side of the valve piston through a passage 40 in the valve piston.

Contained in the chamber 39 and interposed between and engaging the valve piston 35 and the casing, is a spring 41, the pressure of which tends to maintain the valve piston in release position in which the upper end of the valve piston is in abutting engagement with stop shoulders 42 carried by the casing within the chamber 36.

Also contained in the chamber 39 and mounted on the valve piston 35 is an annular valve ring 43 which is adapted to seal against a seat ring 44 carried by the upper end of a fluted stem 45 of an application valve 46 contained in a chamber 47 constantly connected to the main reservoir pipe 9 by way of a branch pipe and passage 48, and subject to the pressure of a spring 49 contained in the valve chamber 47.

Contained in a chamber 50, in the casing, are valves 51 and 52, the valve 51 being operative to control the supply of fluid under pressure from the main reservoir 8 to the emergency passage and pipe 13, and the valve 52 being operative to control the venting of fluid under pressure from the emergency passage and pipe 13.

Contained in the valve chamber 50 and interposed between and engaging both valves 51 and 52 is a spring 53, the pressure of which tends to maintain the emergency pipe vent valve 52 seated and tends to seat the emergency pipe supply valve 51. The valve 51 is also subject to the upward pressure of a spring 54 which is contained in a chamber 55 and which engages the lower end of the fluted stem of the valve 51. The pressure of the spring 54 is sufficient to normally maintain the valve 51 unseated against the opposing pressure of the spring 53.

The emergency pipe vent valve 52 is provided with an upwardly extending fluted stem 56 which projects above a portion of the casing which, in effecting a "foot on" emergency application of the brakes, is operatively engaged by a projection 57 depending downwardly from the top wall of the foot cap 20.

Contained in the chamber 22 is a lever 58 which is fulcrumed, intermediate its ends 59 and 60, to the upper end of the casing through the medium of a fulcrum pin 61. The end 59 of this lever is forked to permit the projection 57 on the foot cap 20 to engage the upper end of the stem 56. The end 60 of the lever is in contact with the projection 19 of the foot cap and is subject to the upward pressure of a spring 62 interposed between and engaging the upper end of the casing and the under side of the end 60. By reason of the engagement of the end 60 with the projection 19, the lever will not be operated when the foot cap is in any position on the casing but when the foot cap is removed, as in changing ends, the pressure of the spring 62 causes the end 60 to move upwardly and the forked end 59 to engage the upper end of the stem 56 and unseat the emergency pipe vent valve 52 as and for the purpose hereinafter fully described.

Contained in a chamber 63 in the casing, is a door controlling rotary valve 64 which is adapted to be operated by a rotatable stem 65 journalled in the casing. The stem 65 extends through the casing and adjacent the casing, has secured thereto an operating arm 66, to which arm is attached one end of a spring 67, the other end of the spring being anchored to a lug 68 which may be integral with the casing.

For the purpose of controlling the operation of the door controlling rotary valve 64, there is a foot lever 69 removably mounted on the outer end of the stem 65. This lever extends upwardly from the stem 65 and terminates adjacent the horizontal plane of the top of the foot cap 20 where it is adapted to be engaged by one of the operator's feet.

In the present embodiment of the invention, the foot lever 69 is arranged behind the foot cap 20 so that it is adapted to be engaged by the side of the heel of one of the operator's feet, whilst the ball of the same foot engages the top of the foot cap 20, but it will be understood that, if desired, the foot lever 69 may be arranged in front of the cap 20, in which position it could be operated by the side of the front portion of the operator's foot, in which case the foot cap 20 would be engaged by the operator's heel.

Figures 2, 3:
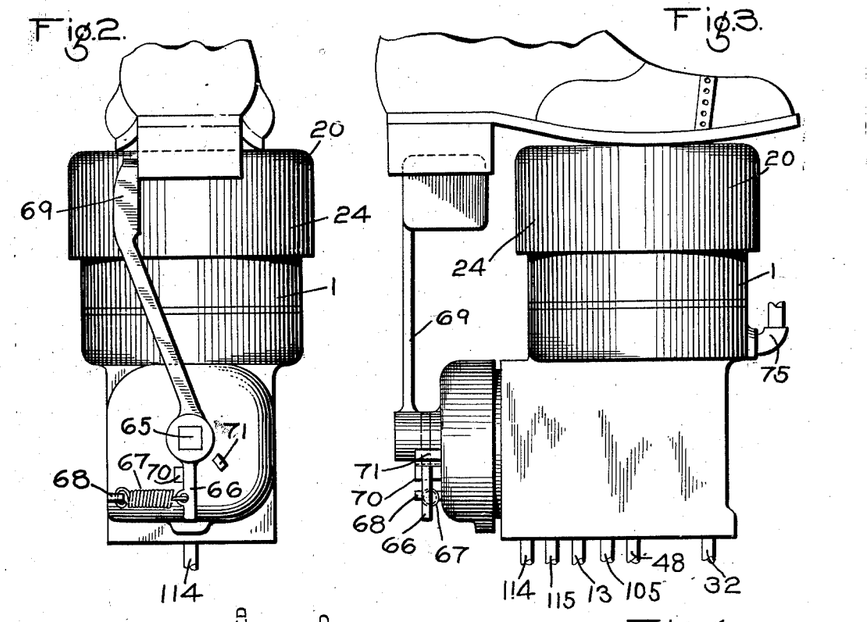
Fig. 2 is an enlarged rear elevational view of the combined foot controlled brake and door controlling valve device.
Fig. 3 is an enlarged side elevational view of the same.
Figure 4:
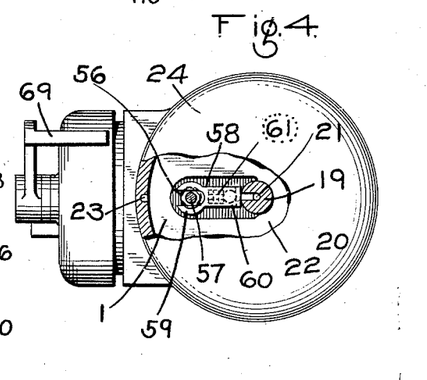
Fig. 4 is an enlarged plan view of the same, a portion of the foot cap being broken away to more clearly illustrate a portion of the mechanism under the cap.
Figure 5:
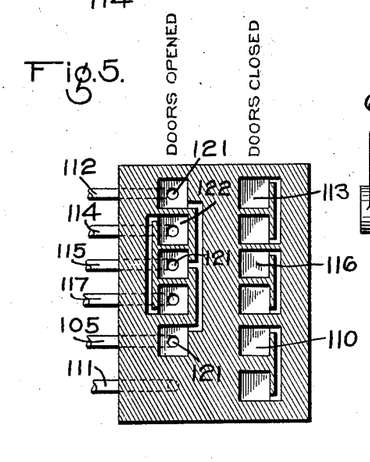
Fig. 5 is a development view of the door controlling rotary valve.

As shown in Figs. 1, 2 and 3 of the drawings, the arm 66 is held against a stop 70 by the spring 67 so that the foot lever is normally maintained in "door closed" position. To operate the foot lever from this position, the operator, by a sidewise movement of his heel, moves the lever toward the left, causing the stem 65 to rotate in the same direction against the power of spring 67 until the arm 66 engages a stop 71 on the casing, at which time the lever and rotary valve 64 will be in "door open" position.

Each safety controller handle device 2 may comprise a handle 72 which is adapted to control the operation of a double beat valve 73, so that when the handle is depressed the pressure of a spring 74 causes the lower end of the valve to seat and the upper end of the valve to unseat. With the upper end of the valve unseated, communication is open from the main reservoir pipe 9 to the safety control pipe 12 by way of a pipe and passage 75, past the vent valve 30, passage and pipe 33, and through the check valve device 34. The seating of the lower end of the valve closes off communication from the pipe 75 to the atmosphere through an atmospheric passage 76.

Each of the cut-out valve devices 3 is interposed between the safety control pipe 12 and the pipe 33 and is provided for the purpose of preventing an emergency application of the brakes in case the operator removes his hand from the controller handle 72 and his foot from the cap 20, after a straight air application of the brakes has been effected.

Each cut-out valve device 3 may comprise a casing having a chamber 77 which is constantly connected to the pipe 33, and contains a cut-off valve 78 subject to the pressure of a spring 79, which valve, when seated, closes communication from the safety control pipe 12 and the pipe 33 and when unseated opens the communication. For controlling the operation of this valve, a piston 80 is provided. Also contained in the casing is a valve piston 81 subject to the pressure of a spring 82 contained in a chamber 83 at one side of the valve piston, which chamber is connected to the atmosphere through a passage 84 in a cap nut having screw-threaded connection with the casing. The outer seated area of the valve piston is connected to the chamber 83 through a passage 85, which passage is connected to a chamber 86 at one side of the piston 80 by way of a passage 87. The inner seated area of the valve piston is constantly connected to a straight air pipe 105.

Each circuit breaker device 4 may comprise a casing containing a piston 88 having a stem 89 extending through and beyond one end of the casing, which stem is adapted to operate the usual circuit breaker switch, (not shown), to open the power circuit. The piston is maintained in its normal position as shown in Fig. 1, by the pressure of a spring 90 contained in a chamber 91 at one side of the piston.

Each door engine 5 may be of the usual type comprising a casing containing door opening and closing pistons 92 and 93, respectively, which are operatively connected by a bar 94, which, in turn, is operatively connected to the door operating mechanism in the usual manner.

The emergency valve device 6 may comprise a casing having a piston chamber 95 connected to the emergency pipe 13 and containing a piston 96, and a valve chamber 97 connected to the main reservoir pipe 9 through a passage and pipe 98 and containing a slide valve 99. With the emergency valve device in release position, as shown in Fig. 1, the piston chamber 95 is connected to the passage 98 through a branch passage 100.

Included in each emergency valve device 6, is a relay valve 101 having one side connected to the safety control passage and pipe 12, and having the outer seated area of the opposite side connected to the emergency passage and pipe 13 through a passage 102. The inner seated area of the valve 101 is connected to the chamber 103 at one side of each of the circuit breaker pistons 88 by way of a passage and pipe 104.

In the release position of the emergency valve device 6, the brake cylinder 7 is connected to the straight air passage and pipe 105 through a pipe and passage 106 and a cavity 107 in the emergency slide valve 99.

The double check valve device 10 is interposed in the safety control pipe 12 so as to control communication through this pipe from either foot valve device 1 to the emergency valve device 6 and may comprise a casing containing a double check valve 108. When the check valve 108 is seated in its right hand position, as shown in Fig. 1, communication is established from the foot valve device 1, at the operating end of the car, to the emergency valve device, whilst communication from the foot valve device 1, at the other end of the car, to the emergency valve device, is closed off.

The double check valve device 11 is interposed in the emergency pipe 13 so as to control communication through this pipe from either foot valve device 1 to the emergency valve device 6, and may comprise a casing containing a check valve 109. When the check valve is seated in its right hand position, communication is established from the foot valve device 1, at the operating end of the car, to the emergency valve device, whilst communication from the foot valve device 1, at the other end of the car, to the emergency valve device is closed off.

In Fig. 1 the combined brake and door controlling device 1, at the operating end of the car, is in release and running position and the safety controller handle 72 is depressed, while the device 1, at the other or non-operating end of the car, is shown in position with the operating cap 20 and foot lever 69 removed and the controller handle 72 removed from the safety controller handle device 2.

Assuming that the foot cap 20, pedal 69 and controller handle are each removed, both combined brake and door controlling valve devices 1 and both safety controller handle devices in non-operating positions and the other parts of the equipment in the positions shown in Fig. 1, the operator, preparatory to starting the car, places the foot cap 20 over the upper end of the casing of the device 1 at the operating end of the car, the pedal 69 on the stem 65 and the controller handle 72 in the safety controller handle device 2. As the operator thus places the foot cap on the casing, the projection 19 on the cap engages the end 60 of the lever and causes it to move downwardly against the pressure of the spring 62, consequently moving the forked end 59 of the lever upwardly out of engagement with the stem 56 of the emergency pipe vent valve 52, permitting the pressure of the spring 53 to seat the valve 52 closing off the atmospheric communication from the emergency pipe and passage 13. When the vent valve 52 seats, the pressure of the spring 54 causes the emergency pipe supply valve 51 to unseat against the pressure of the spring 53 establishing communication through which fluid under pressure from the passage 118, as supplied from the main reservoir, is adapted to be supplied to the emergency passage and pipe 13.

The operator, by the use of his foot, now depresses the foot cap 20, operating the valve device 1 to running and release position as shown in Fig. 1, and by the use of his hand depresses the controller handle 72 permitting the pressure of the spring 74 to operate the double beat valve to its lower seated position thus establishing communication from the main reservoir pipe 9 to the pipe 75.

As the foot cap 20 is being depressed the valve 15 is unseated against the pressure of the spring 27, so that the brake cylinder 7 is connected to the atmosphere by way of pipe and passage 106, cavity 107 in the emergency slide valve 99, straight air passages and pipe 105, a cavity 110 in the door controlling rotary valve 64, a passage 111, chamber 39, passage 40 in the valve piston 35, chamber 36, passages 37 in the casing wall 26, release valve chamber 14, past the unseated release valve 15, through slot 18 in the release valve stem 17, passage 21 in the projection 19 of the cap 20, chamber 22 and exhaust groove 23 in the wall 24 of the cap 20.

When the valve device 1 has been operated to release and running position, i. e., when the lower end of the release valve stem 25 engages the upper end of the projection 38 of the valve piston 35, the spring pressed plunger 28, carried by the release valve 15, will have been moved out of operative engagement with the plunger 29 and the pressure of the light spring 32 will have seated the valve 30.

When the foot cap 20 of the valve device 1 is moved downwardly, as just described, the foot lever 69 will not be operated, unless desired, so that the power of the spring 61 will maintain the lever 69 and consequently the door controlling rotary valve 64 in door closed position, as shown in Figs. 1, 2 and 3.

Fluid under pressure supplied to the main reservoir 8 by the usual fluid compressor (not shown), flows to the application valve chambers 47 of both valve devices 1 through the main reservoir pipe 9 and branch pipe and passage 48. With the door controlling rotary valves 64 in door closed position, fluid under pressure from the passages 48 flows to the door closing sides of the door engines 5 through branch passages 112, rotary valve chambers 63, ports 113 in the rotary valves 64 and door closing passages and pipes 114. The door opening sides of these door engines are vented to the atmosphere by way of the door opening pipes and passages 115, cavities 116 in the rotary valves 64 and passages 117. With the door closing sides of the door engine thus supplied with fluid under pressure and the door opening sides vented, the doors of the car will be maintained closed.

With the valve device 1, at the operating end of the car, in release and running position, fluid under pressure supplied to the passage 112 from the main reservoir 8 flows to the piston chamber 95 in the emergency valve device 6 through a passage 118, past the unseated valve 51, through valve chamber 50 and the emergency passages and pipe 13, the fluid under pressure in the emergency pipe flowing past the unseated side of the check valve 109. The seated side of the check valve 109 is connected to the atmosphere through the emergency pipe and passage 13, valve chamber 50 in the valve device 1, at the non-operating end of the car, and past the unseated emergency pipe vent valve 52, so that the pressure of fluid supplied to the emergency pipe from the operating end of the car maintains the check valve in its right hand seated position.

Fluid under pressure supplied to the emergency passage 13 in the emergency valve device 6 flows to the outer seated area of the relay valve 101 through the passage 102.

Fluid under pressure is supplied from the main reservoir pipe 9 to the slide valve chamber 97 in the emergency valve device through pipe and passage 98 and, with the emergency piston 96 in release position, is also supplied to the piston chamber 95 through the pipe 98 and a branch passage 100.

With the controller handle 72, at the operating end of the car, depressed, fluid under pressure is supplied from the main reservoir 8 to the chamber at the upper side of the relay valve 101, included in the emergency valve device 6, through main reservoir pipe 9, past the unseated upper end of the double beat valve 73 in the safety controller handle device 2, through pipe and passage 75, past the valve 30 in the valve device 1, said valve being unseated against the pressure of the light spring 32 by the pressure of fluid in the passage 75, through passage and pipe 33, check valve 34 and safety control pipe and passage 12. Fluid under pressure from the pipe 33 also flows to the safety control pipe 12 by way of valve chamber 77 in the cut-off valve device 3, at the operating end of the car, and past the normally unseated cut-off valve 78. Fluid under pressure supplied to the safety control pipe 12 flows past the unseated end of the check valve 108.

The seated side of the check valve 108 is connected to the atmosphere through the safety control pipe 12, at the non-operating end of the car, past the unseated cut-off valve 78, through the cut-off valve chamber 77, pipe and passage 33, past the unseated safety control pipe vent valve 30 of the valve device 1 at the non-operating end of the car, passage and pipe 75, past the unseated lower end of the double beat valve 73 of the safety controller handle device 2, and through the passage 76, so that the pressure of fluid in the safety control pipe maintains the check valve 108 seated in its right hand position.

With the equipment thus fully charged, and it desired to effect a service application of the brakes, the operator, by increasing his foot pressure on the foot cap 20, causes the foot cap to be moved downwardly from release and running position toward service position.

As the foot cap 20 is thus further depressed, the valve piston 35 is moved downwardly against the pressure of the spring 41, through the medium of the foot cap projection 19, release valve stems 17 and 25 and projection 38 of the valve piston, the pressure of the spring 27 also opposing the downward movement of the foot cap.

When the valve piston 35 seals against the seat ring 44 on the release valve stem 45, the atmospheric communication from the chamber 39, by way of the passage 40 in the valve piston, is closed.

Further downward movement of the foot cap 20, after the valve piston 35 seals against the seat ring 44, causes the application valve 46 to be unseated against the pressure of the spring 49.

With the application valve 46 thus unseated, fluid under pressure in the valve chamber 47 flows past the unseated valve 46 and its fluted stem 45 to the chamber 39 and from thence flows to the brake cylinder 7 through passage 111, cavity 110 in the rotary valve 64, straight air passage and pipe 105, cavity 107 in the emergency slide valve 99 and passage and pipe 106.

Now when the brake cylinder pressure present in the valve piston chamber 39, acting on the outer seated area of the valve piston 35, is sufficient to overcome the operator's foot pressure on the foot cap 20, the valve piston 35 is caused to move upwardly, and as the valve piston is thus operated, the foot cap 20, with the operator's foot thereon, will also be operated upwardly, due to the engagement of the projection 38 of the valve piston 35 with the release valve stem 25, and the engagement of the release valve stem 17 with the projection 19 of the foot cap 20.

When the valve piston 35 is thus operated upwardly, the pressure of the spring 49 causes the application valve to move in the same direction and seat, closing off the supply of fluid under pressure to the brake cylinder. During the upward movement of the valve piston 35 and application valve 46, an air tight seal is maintained between the valve piston and its seat ring 44 on the stem 51 of the application valve, so that the brake cylinder pressure will not be permitted to reduce to the atmosphere by way of the passage 40 in the valve piston. When the application valve 46 seats, the upward movement of the foot cap 20, valve 15, valve piston 35 and application valve 46 will come to a stop, and unless the operator's foot pressure is increased or decreased, the brake cylinder pressure will be maintained.

When in effecting a straight air application of the brakes, the pressure of fluid supplied to the straight air pipe 105 and acting on the inner seated area of the valve piston 81 of the cut-off valve 3, is sufficient to overcome the pressure of the spring 82, the valve piston 82 will be unseated permitting fluid under pressure from the straight air pipe to flow to the piston chamber 86 by way of passages 85 and 87. Fluid under pressure thus supplied to the piston chamber 86, causes the cut-off piston to move downwardly, seating the cut-off valve 78 against the pressure of the spring 79, thus closing communication from the straight air pipe 12 to the pipe 33, the check valve 34 preventing the flow of fluid from the pipe 12 around the cut-off valve device.

With the cut-off valve 78 seated, the operator may remove his hand from the controller handle 72 and his foot from the foot cap 20 without effecting an emergency application of the brakes.

To release the brakes, the operator relieves the foot cap 20 of some of his foot pressure and permits the valve piston 35 to return to its release and running position as shown in Fig. 1 in which the valve piston 35 is unseated from its seat ring 44, permitting fluid under pressure from the brake cylinder 7 to flow to the atmosphere by way of pipe and passage 106, cavity 107 in the emergency slide valve 99, straight air passage and pipe 105, cavity 110 in the door controlling rotary valve 64, passage 111, chamber 39, passage 40 in the valve piston 39, valve piston chamber 36, passages 37 in the casing wall 26, release valve chamber 14, groove 18 in the release valve stem 17, passage 21 in the projection 19 of the foot cap 20, chamber 22 and exhaust groove 23 in the wall 24 of the foot cap.

When the straight air pipe 105 is thus vented, the pressure of the spring 82 of the cut-off valve device 3, operates the valve piston 81 to its seated position, permitting fluid under pressure in the piston chamber 86, to flow to the atmosphere by way of passages 87 and 85, chamber 83 and passage 84. With the chamber 86 thus vented, the pressure of the spring 79 causes the cut-off valve to be returned to its unseated position again establishing communication from the straight air pipe 12 to the pipe 33.

If, after a service application of the brakes has been effected, it is desired to effect the gradual release of the brakes, the operator reduces his foot pressure on the foot cap 20 any desired amount, permitting the valve piston 35 to unseat from its seat ring 44, so that fluid under pressure from the brake cylinder 7 will flow to the atmosphere in the same manner as just described in connection with the full release of the brakes. Now when the brake cylinder pressure present in chamber 39 has been reduced below the opposing foot pressure of the operator, the operator's foot pressure will cause the valve piston 35 to move downwardly and again seal against the seat ring 44 and close off the further flow of fluid from the brake cylinder to the atmosphere.

It will be noted from the foregoing description that the operator, by varying his foot pressure on the foot cap 20, may easily graduate the application and release of the brakes.

If the operator desires to effect an emergency application of the brakes, he depresses the foot cap 20 to its extreme downward position. As the foot cap is thus operated, the projection 57 on the foot cap passes through the forked end 59 of the lever 58 and engages the upper end of the stem 56 of the emergency pipe vent valve 52, causing said valve to be unseated. When the valve 52 is thus operated, the pressure of the spring 53 contained in the valve chamber is increased sufficiently to seat the emergency pipe supply valve 51 against the pressure of the spring 54. The seating of the valve 51 closes off the further supply of fluid under pressure from the main reservoir to the valve chamber 50.

With the emergency pipe vent valve 52 unseated, fluid under pressure from the emergency piston chamber 96 is discharged to the atmosphere by way of emergency passages and pipe 13, past the unseated vent valve 52, through chamber 22 and exhaust groove 23 in the wall 24 of the foot cap 20.

With the emergency piston chamber 95 thus vented, the pressure of fluid in the emergency slide valve chamber 97 causes the piston to operate to extreme right hand position, carrying with it the emergency slide valve 99. In this position, the end of the slide valve 99 is beyond the brake cylinder passage 106, so that fluid under pressure from the main reservoir pipe 9 is supplied to the brake cylinder 7 through pipe and passage 98, emergency piston chamber 97, past the end of the emergency slide valve 99 and brake cylinder passage and pipe 106.

To release such an emergency application of the brakes, the operator, by the relief of sufficient foot pressure on the foot cap 20, permits the foot valve device 1 to operate to running and release position, in which the emergency pipe vent valve 52 is seated and the emergency pipe supply valve 51 is unseated.

With the valve 51 unseated, fluid under pressure from the main reservoir pipe 9 is again supplied to the emergency piston chamber 95 causing the emergency piston 96 to operate to its extreme left hand position in which the brake cylinder passage 106 and straight air passage 105 are connected through the emergency slide valve cavity 107. Fluid under pressure from the brake cylinder is now discharged to the atmosphere in the same manner as described in connection with the release of the brakes after a service application.

Should the operator be incapacitated or for any other reason remove his hand from the safety controller handle 72 and his foot from the foot cap 20, an emergency application of the brakes will be automatically effected in the following manner.

When the pressure of the operator's hand is entirely relieved from the controller handle 72, the pressure of a spring 125, in the safety controller handle device 2, acting through a lever 126 pivoted at 127 to the casing of the device causes the double beat valve 73 to move upwardly against the pressure of the spring 74, seating the upper end of the valve and unseating the lower end. With the upper end seated, the supply of fluid under pressure from the main reservoir pipe 9 to the pipe 75 is closed off and with the lower end unseated, communication is established from the pipe 75 to the atmosphere.

When the pressure of the operator's foot is entirely relieved from the foot cap 20, the pressure of the spring 27 causes the release valve 15 to move upwardly and to seal against the seat ring 16 on the casing, thus closing off the atmospheric communication from the brake cylinder 7.

As the release valve 15 is moving toward its seat ring 16, the spring pressed plunger 28 carried thereby, engages the plunger 29 mounted in the casing and operates it upwardly, unseating the valve 30 against the pressure of the spring 32, thus establishing communication from the passage 33 to the pipe 75.

With the lower end of the double beat valve 73 unseated and the valve 30 also unseated, fluid under pressure in the chamber at the upper side of the relay piston valve 101, in the emergency valve device 6, flows to the atmosphere through passage and pipe 12, past the unseated cut-off valve 78, through the cut-off valve chamber 77, pipe and passage 33, valve chamber 31 in the valve device 1, past the unseated valve 30, through passage and pipe 75, past the unseated lower end of the double beat valve 73 of the safety controller handle device 2, and through the atmospheric passage 69.

With the relay piston valve chamber thus vented, the pressure of fluid from the passage 102, as supplied from the emergency passage and pipe 13, acting on the outer seated area of the relay piston valve 101, causes the piston valve to be unseated, so that fluid under pressure from the emergency passage 13 and emergency piston chamber 95, flows to the piston chamber 103 of the circuit breaker devices 4 by way of passage 102, past the unseated piston valve and through passage and pipe 104, causing the circuit breaker pistons 88 to move outwardly against the pressures of the springs 90, operating the usual line switches (not shown) to open the car motor circuit.

When the pistons 88 have thus been operated they uncover ports 120 in the casing so that fluid under pressure from the emergency piston chamber 95 is discharged to the atmosphere through these ports.

With the emergency piston chamber 95 thus vented, the emergency valve device 6 operates to emergency position supplying fluid under pressure to the brake cylinder in the same manner as described in connection with the foot on emergency application of the brakes.

The pressures of the springs now return the circuit breaker pistons to their inner positions and the piston valve 101 again seats.

The opening and closing of the door, at the operating end of the car, is controlled by the door controlling portion of the combined foot controlled brake and door controlling valve device 1, and it will be understood that the door may be opened at any time regardless of the position of the brake valve portion of the valve device 1.

To operate the door controlling portion of the valve device 1 from "door closed" position as shown in Figs. 1, 2 and 3, to "door open" position, the operator, by the use of his heel, operates the foot lever 69 sidewise toward the left, rotating the stem 65 and rotary valve 64 in the same direction against the power of the spring 67 until such time as the arm 66 comes to a stop in door open position against the stop 71.

With the door controlling rotary valve in door open position, fluid under pressure in the rotary valve chamber 63, as supplied from the main reservoir pipe 9 through pipe and passages 48 and passage 112, is supplied to the door opening pipe 115 and the straight air pipe 105 through connected ports 121 in the rotary valve 64. Further, with the rotary valve in this position, the door closing side of the door engine is vented to the atmosphere by way of the door closing pipe and passage 114 and a cavity 122 in the rotary valve 64, and still further the rotary valve closes communication from the straight air passage 105 to the atmosphere by way of the passage 111.

With the passage 111 thus lapped by the rotary valve 64, and fluid under pressure supplied to the brake cylinder 7 through the straight air passage and pipe 105, cavity 107 in the emergency slide valve 99 and passage and pipe 106, a straight air application of the brakes will be effected if an application of the brakes has not already been effected.

It will be noted that when the rotary valve is in door open position, the brakes cannot be released since the passage 111 is lapped by the rotary valve 64.

To release the brakes, the operator relieves his sidewise foot pressure from the foot lever 69, permitting the power of the spring to operate the rotary valve 64 to door closed position and to return the foot lever to its normal door closed position as shown in Figs. 1, 2 and 3. When the rotary valve 64 is returned to its "door closed" position, the straight air passage 105 is again connected to the passage 111, leading to the chamber 39, so that, when the brake valve portion of the device 1 is operated to release and running position, fluid under pressure from the brake cylinder 7 will flow to the atmosphere in the same manner as has been described in connection with the release of the brakes after a service application.

With the rotary valve 64 in "door closed" position, the door opening side of the door engine 5 is vented to the atmosphere and the door closing side is supplied with fluid under pressure so that the door will be closed.

It will be seen that when the car door is opened an application of the brakes will be automatically effected, and further that the brakes cannot be released until the door is closed.

Assuming that the vehicle has been brought to a stop by a straight air application of the brakes, the foot cap 20 to be in "foot off" position, and the controller handle 72 in "hand off" position, and it is desired to change ends. To do this, the operator removes the controller handle 72, foot cap 20 and door controlling heel pedal 69, and places them in their proper operative positions at the non-operating end of the car.

When the foot cap 20 is thus removed, the pressure of the spring 62 of the valve device 1 at the operating end of the car causes the lever 58 to operate to unseat the emergency pipe vent valve 52 and to seat the emergency pipe supply valve 51. With the valve 52 unseated, the emergency piston chamber 95 is vented to the atmosphere so that the emergency valve device operates to emergency position.

Now when the foot cap 20 is placed on the valve device 1 at the non-operating or right hand end of the car, the projection 19 on the cap engages the lever 58 and operates it out of engagement with the stem 56 of the emergency pipe vent valve 52, which permits the valve 52 to be seated and the emergency pipe supply valve 51 to be unseated. With the valve 51 unseated, fluid under pressure from the main reservoir is supplied to the emergency pipe 13 causing the check valve 109 of the double check valve device 11 to operate to its left hand seated position closing off communication from the emergency piston chamber 95 to the atmosphere through the emergency pipe at the left hand end of the car and establishing communication through which fluid under pressure from the emergency pipe, at the right hand end of the car, flows to the emergency piston chamber 95. With fluid under pressure thus supplied to the emergency piston chamber, the emergency valve device will be operated to its normal release position.

Now by operating the foot cap 20 downwardly to release and running positions, fluid under pressure is released from the brake cylinder 7 to the atmosphere by way of the valve straight air pipe 105 and device 1 at the right hand end of the car.

With controller handle at the right hand end of the car depressed, fluid under pressure is supplied to the safety control pipe 12.

When the straight air pipe 105 is vented to the atmosphere as just described, the cut-off valve device 3 at the left hand end of the car will be caused to operate to connect the right hand end of the safety control pipe to the atmosphere by way of the valve device 1 at the left hand end of the car, so that fluid under pressure supplied to the right hand end of the safety control pipe will cause the check valve 108 of the double check valve device 10 to operate to its left hand seated position thus maintaining the safety control pipe charged.

The equipment is now in condition to be operated to control the brakes in the same manner as hereinbefore described.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a fluid pressure brake, the combination with a brake cylinder and a pipe through which fluid under pressure is supplied and released to and from the brake cylinder, of a brake valve device for controlling the supply and release of fluid under pressure to and from said pipe and comprising a valve piston and a release valve normally establishing communication from said pipe to the atmosphere, said release valve being maintained in its normal position by manual pressure, and operative upon the entire relief of manual pressure for closing said communication.

2. In a fluid pressure brake, the combination with a brake cylinder and a pipe through which fluid under pressure is supplied and released to and from the brake cylinder, of a brake valve device for controlling the supply and release of fluid under pressure to and from said pipe, an element controlled by manual pressure for controlling the operation of the brake valve device, an application valve normally seated and operative to supply fluid under pressure to said pipe, a release valve and a valve piston normally connecting said pipe to the atmosphere, said release valve being maintained in its normal position by manual pressure on said element and operative upon an increase in manual pressure on said element to operate said valve piston to close the connection from said pipe to the atmosphere and to operate said application valve to supply fluid under pressure to said pipe.

3. In a fluid pressure brake, the combination with a brake cylinder and a pipe through which fluid under pressure is supplied and released to and from the brake cylinder, of a brake valve device for controlling the supply and release of fluid under pressure to and from said pipe, an element controlled by manual pressure for controlling the operation of the brake valve device, an application valve normally seated and operative to supply fluid under pressure to said pipe, a release valve and a valve piston normally connecting said pipe to the atmosphere, said release valve being maintained in its normal position by manual pressure on said element and operative upon an increase in manual pressure on said element to operate said valve piston to close the connection from said pipe to the atmosphere and to operate said application valve to supply fluid under pressure to said pipe and operative upon the entire relief of pressure from said element for closing the connection from said pipe to the atmosphere.

4. In a fluid pressure brake, the combination with a brake cylinder and a pipe through which fluid under pressure is supplied and released to and from the brake cylinder, of a brake valve device for controlling the supply and release of fluid under pressure to and from said pipe and a plurality of valves normally establishing communication from said pipe to the atmosphere and an application valve normally seated and operative to supply fluid under pressure to said pipe, one of said valves being maintained in its normal position by manual pressure and operative upon an increase in manual pressure for operating the other of said valves to operate said application valve to supply fluid under pressure to said pipe, and operative upon the entire relief of manual pressure for permitting the other of said valves and the application valve to operate to their normal positions and for closing off the communication from said pipe to the atmosphere.

5. In a safety car control equipment, the combination with a fluid pressure brake apparatus and a fluid pressure door apparatus, of a combined foot controlled brake and door controlling valve device for controlling the operation of the brake apparatus to apply and release the brakes and for controlling the operation of the door apparatus to open and close the doors, a foot cap subject to the downward pressure of one foot of an operator for controlling the operation of said device to control the operation of said brake apparatus, and a foot lever subject to the sidewise pressure of the same foot for controlling the operation of the door apparatus.

6. In a safety car control equipment, the combination with a fluid pressure brake apparatus and a fluid pressure door apparatus, of a combined foot controlled brake and door controlling valve device for controlling the operation of the brake apparatus to apply and release the brakes and for controlling the operation of the door apparatus to open and close the doors, a foot cap subject to the downward pressure of one foot of an operator for controlling the operation of said device to control the operation of said brake apparatus, and a foot lever subject to the sidewise pressure of the same foot for controlling the operation of the door apparatus, said cap and lever being operative independently of each other.

7. In a safety car control equipment, the combination with a safety control pipe, a reduction in pressure in which is adapted to effect an application of the brakes, of a foot controlled brake valve device, a controller handle, a valve operated upon the relief of pressure on said handle and a valve operated upon the relief of pressure on said brake valve device for venting fluid under pressure from said safety control pipe.

8. In a safety car control equipment, the combination with a safety control pipe, a reduction in pressure in which is adapted to effect an application of the brakes and a straight air pipe, of a foot controlled brake valve device, a controller handle, a valve operated upon the relief of pressure on said handle and a valve operated upon the relief of pressure on said brake valve device for venting fluid under pressure from said safety control pipe, and a valve device subject to the pressure of fluid from said straight air pipe for preventing the reduction of the pressure of fluid in said safety control pipe upon relief of pressure from the controller handle and brake valve device.

9. In a safety car control equipment, the combination with a straight air pipe, of a brake valve device subject to a certain manual pressure for normally maintaining the straight air pipe connected to the atmosphere and operative upon an increase in manual pressure for closing off the connection from the straight air pipe to the atmosphere and for supplying fluid under pressure to the straight air pipe to effect an application of the brakes, and a valve operative upon the entire relief of manual pressure from the brake valve device for closing communication from the straight air pipe to the atmosphere.

10. In a safety car control equipment, the combination with a brake cylinder and a straight air pipe through which fluid under pressure is supplied and released to and from the brake cylinder, of a relay valve operated upon a reduction in pressure thereon for effecting an emergency application of the brakes, a brake valve device controlled by manual pressure for controlling the supply and release of fluid under pressure to and from said straight air pipe, a controller handle, a valve operated upon relief of manual pressure on said handle and a valve operated upon the relief of manual pressure on said brake valve device for establishing communication from said relay valve to the atmosphere, means interposed between said relay valve and brake valve device subject to the pressure of fluid in said straight air pipe for controlling communication from the relay valve to the brake valve device, and a valve operative upon the entire relief of manual pressure from the brake valve device for closing communication from the straight air pipe to the atmosphere.

11. In a safety car control equipment, the combination with an emergency pipe and an emergency valve device operative to effect an emergency application of the brakes upon a reduction in pressure in said emergency pipe, of a relay valve operative upon a reduction in pressure thereon for venting said emergency pipe to the atmosphere, a controller handle, a brake valve device, a foot controlled element for controlling the operation of said brake valve device, and two valves operative upon the entire relief of pressure from said controller handle and foot controlled element for venting fluid under pressure from said relay valve to the atmosphere.

12. The combination with a fluid pressure brake apparatus, of a brake valve device subject to variations in the pressure of a foot of an operator for normally controlling the operation of said apparatus to effect an application and release of the brakes, a safety controller handle device, and a plurality of valves operative upon the entire relief of manual pressure from said safety controller handle device and brake valve device for effecting an emergency application of the brakes.

13. The combination with a fluid pressure brake apparatus, of a brake valve device subject to variations in the pressure of a foot of an operator for normally controlling the operation of said apparatus to effect an application and release of the brakes, and a safety controller handle device, said brake valve device and safety controller handle device being operative upon the entire relief of manual pressure thereon for effecting an emergency application of the brakes.

14. The combination with a fluid pressure brake apparatus, of a brake valve device subject to variations in the pressure of a foot of an operator for normally controlling the operation of said apparatus to effect an application and release of the brakes, a safety controller handle device, and a circuit breaker device, said brake valve device and safety controller handle device being operative upon the entire relief of manual pressure thereon for effecting an emergency application of the brakes and for effecting the operation of said circuit breaker device to open the motor circuit of the vehicle.

15. In a safety car control equipment, the combination with a brake cylinder and a straight air pipe through which fluid under pressure is supplied and released to and from the brake cylinder, of a brake valve device operative to normally supply and release fluid under pressure to and from said pipe, and a door controlling valve normally establishing communication from said straight air pipe to the brake valve device and for establishing communication through which fluid under pressure is supplied to maintain a door of the vehicle closed and having a position for opening the door of the vehicle and closing the communication from the brake valve device to the straight air pipe and establishing communication through which fluid under pressure is supplied to said straight air pipe independently of the brake valve device.

16. In a safety car control equipment, the combination with a brake cylinder and a straight air pipe through which fluid under pressure is supplied and released to and from the brake cylinder, of a brake valve device operative to normally supply and release fluid under pressure to and from said pipe, and a door controlling valve having a door closing position in which communication is established from the brake valve device to the straight air pipe and having a door opening position in which said communication is closed off and another communication established through which fluid under pressure is supplied to the straight air pipe independently of the brake valve device.

17. In a double end safety car control equipment for a vehicle, the combination with an emergency valve device operative upon a reduction in fluid pressure for effecting an emergency application of the brakes, of a pipe leading to each end of the vehicle through which the pressure of fluid in said emergency valve device may be reduced, a brake valve device at each end of the car and connected to one of said pipes, a valve in each of said brake valve devices operative to reduce the pressure of fluid in the emergency valve device, a foot controlled element removably mounted on the brake valve device subject to manual pressure for operating the valve at the operating end of the car to reduce the pressure of fluid in the emergency valve device, and means operative upon the removal of the foot controlled element for operating said valve to reduce the pressure of fluid in the emergency valve device.

18. In a double end safety car control equipment for a vehicle, the combination with an emergency valve device operative upon a reduction in fluid pressure for effecting an emergency application of the brakes, of a pipe leading to each end of the vehicle through which the pressure of fluid in said emergency valve device may be reduced, a brake valve device at each end of the car and connected to one of said pipes, a valve in each of said brake valve devices operative to reduce the pressure of fluid in the emergency valve device, a foot controlled element removably mounted on the brake valve device subject to manual pressure for operating the valve at the operating end of the car to reduce the pressure of fluid in the emergency valve device, means operative upon the removal of the foot controlled element for operating said valve to reduce the pressure of fluid in said emergency valve device, and a double check valve device for controlling communication from said emergency valve device to said pipes.

19. In a double end safety car control equipment for a vehicle, the combination with an emergency valve device operative upon a reduction in fluid pressure for effecting an emergency application of the brakes, of a pipe leading to each end of the vehicle through which the pressure of fluid in said emergency valve device may be reduced, a brake valve device at each end of the car and connected to one of said pipes, a valve in each of said brake valve devices operative to reduce the pressure of fluid in the emergency valve device, a foot controlled element removably mounted on the brake valve device subject to manual pressure for operating the valve at the operating end of the car to reduce the pressure of fluid in the emergency valve device, and a lever operative upon the removal of said element for operating said valve to reduce the pressure of fluid in said emergency valve device.

20. The combination with a brake and door controlling apparatus for a vehicle, of valve mechanism operative to control the application and release of the brakes, a valve operative to control the opening and closing of a door of the vehicle, a vertically movable element subject to the foot pressure of an operator for controlling the operation of said valve mechanism, and a laterally movable element subject to the foot pressure of the operator for controlling the operation of said valve, the operation of both of said elements being controlled by the same foot of the operator.

21. The combination with a brake and door controlling apparatus for a vehicle, of valve mechanism operative to control the application and release of the brakes, a valve operative to control the opening and closing of a door of the vehicle, a vertically movable element subject to the downward pressure of an operator's foot for controlling the operation of said valve mechanism, and an element subject to the pressure of the same foot of the operator in a different direction for controlling the operation of said valve.

22. The combination with a brake and door controlling apparatus for a vehicle, of valve mechanism operative to control the application and release of the brakes, a valve operative to control the opening and closing of a door of the vehicle, a vertically movable element subject to the downward pressure of the forward portion of an operator's foot for controlling the operation of said valve mechanism, and an element subject to the lateral pressure of the heel of the same foot for controlling the operation of said valve.

23. The combination with a brake and door controlling apparatus for a vehicle, of valve mechanism operative to control the application and release of the brakes, a valve operative to control the opening and closing of a door of the vehicle, a vertically movable element subject to the downward pressure of an operator's foot for controlling the operation of said valve mechanism, and an element arranged behind and in close proximity to said vertically movable element and subject to lateral pressure by the same foot of the operator for controlling the operation of said valve.

24. The combination with a brake and door controlling apparatus for a vehicle, of a valve mechanism operative to control the application and release of the brakes, a vertically movable element subject to pressure by the foot of an operator for controlling the operation of said valve mechanism, a rotary valve operative to control the opening and closing of a door of the vehicle, and an element subject to pressure by the same foot of the operator for rotating said rotary valve.

25. The combination with a brake and door controlling apparatus for a vehicle, of a valve mechanism comprising a plurality of vertically movable valves operative to control the application and release of the brakes, of an element subject to downward pressure by the foot of an operator for controlling the operation of said valves, a rotary valve operative to control the opening and closing of a door of the vehicle, and an element subject to lateral pressure by the same foot of the operator for controlling the operation of said rotary valve.

26. The combination with a brake and door controlling apparatus for a vehicle, of a valve device operative to control the application and release of the brakes and to control the opening and closing of a door of the vehicle, said device comprising a casing, valves mounted in said casing and operative to control the brakes, an element movable longitudinally of the casing subject to pressure by a foot of an operator for controlling the operation of said valves, a valve mounted in said casing operative to control the operation of said door, and an element movable laterally of the casing subject to pressure by the same foot of the operator for controlling the operation of said valve.

27. The combination with a brake and door controlling apparatus for a vehicle, of a valve device operative to control the application and release of the brakes and to control the opening and closing of a door of the vehicle, said device comprising a casing, valves mounted in said casing and operative to control the brakes, an element slidably mounted on the casing subject to pressure by a foot of an operator for controlling the operation of said valves, a valve mounted in said casing operative to control said door, and an element subject to pressure by the same foot of the operator for controlling the operation of said valve.

28. The combination with a brake and door controlling apparatus for a vehicle, of a valve device operative to control the application and release of the brakes and to control the opening and closing of a door of the vehicle, said device comprising a casing, valves mounted in said casing and operative to control the brakes, a cap telescoping one end of said casing and movable longitudinally of the casing for controlling the operation of said valves, said cap being subject to pressure by a foot of an operator, a valve mounted in said casing operative to control the operation of said door, and means subject to pressure by the same foot of the operator for controlling the operation of said valve.

29. The combination with a brake and door controlling apparatus for a vehicle, of a valve device operative to control the application and release of the brakes and to control the opening and closing of a door of the vehicle, said device comprising a casing, valves mounted in said casing and operative to control the brakes, a cap telescoping one end of said casing and movable longitudinally of the casing for controlling the operation of said valves, said cap being subject to pressure by a foot of an operator, a rotary valve mounted in said casing operative to control the operation of said door, and a lever subject to pressure by the same foot of the operator for rotating said rotary valve.

In testimony whereof, we have hereunto set our hands, this 7th day of November, 1929.

MABLE M. THOMAS,
*Executrix of the Last Will and Testament of Thomas H. Thomas, Deceased.*
UNCAS A. WHITAKER.